United States Patent
Kurokawa et al.

(10) Patent No.: US 7,016,706 B2
(45) Date of Patent: Mar. 21, 2006

(54) MOBILE RADIO TERMINAL

(75) Inventors: Osamu Kurokawa, Hino (JP); Masaaki Furusawa, Tokyo (JP); Junichi Igarashi, Fussa (JP); Kiyoshi Wagai, Hachioji (JP); Yasuhiro Tsukui, Tsukui-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 10/260,429

(22) Filed: Oct. 1, 2002

(65) Prior Publication Data

US 2003/0064759 A1 Apr. 3, 2003

(30) Foreign Application Priority Data

| Oct. 1, 2001 | (JP) | ............................. 2001-305768 |
| Aug. 13, 2002 | (JP) | ............................. 2002-235832 |

(51) Int. Cl.
*H04M 1/00* (2006.01)

(52) U.S. Cl. .................. 455/566; 455/567; 455/550.1; 455/414.1; 455/412.1; 455/412.2; 455/458; 455/425; 379/418; 379/419; 379/440

(58) Field of Classification Search ................ 455/567, 455/566, 412.2, 458, 457, 425, 550.1, 414.1, 455/412.1; 379/418, 419, 440
See application file for complete search history.

(56) References Cited

U.S. PATENT DOCUMENTS

| 6,259,934 | B1 * | 7/2001 | Guerlin ...................... 455/566 |
| 6,463,129 | B1 * | 10/2002 | Park ........................... 379/67.1 |
| 6,628,971 | B1 * | 9/2003 | Yoon et al. .................. 455/566 |
| 6,771,991 | B1 * | 8/2004 | Gupta et al. ................. 455/566 |
| 6,782,281 | B1 * | 8/2004 | Nagasawa ................. 455/575.3 |
| 2002/0006781 | A1 * | 1/2002 | Narusawa ................... 455/412 |
| 2002/0068586 | A1 * | 6/2002 | Chun et al. .................. 455/458 |
| 2003/0176206 | A1 * | 9/2003 | Taniguchi et al. .......... 455/567 |
| 2004/0077386 | A1 * | 4/2004 | Nagasawa ................. 455/575.1 |
| 2004/0157612 | A1 * | 8/2004 | Kim ........................... 455/445 |

FOREIGN PATENT DOCUMENTS

| JP | 10-248058 | 9/1998 |
| JP | 11-317793 | 11/1999 |
| JP | 2002-171316 | 6/2002 |
| JP | 2002-204288 | 7/2002 |

* cited by examiner

*Primary Examiner*—Lester G. Kincaid
*Assistant Examiner*—Khai Nguyen
(74) *Attorney, Agent, or Firm*—Oblon, Spivak, McClelland, Maier & Neustadt, P.C.

(57) ABSTRACT

An image processing section reads out moving picture data from a memory section in accordance with an instruction from a control section, and subjects the moving picture data to a predetermined data process and converts it to image data and voice data. Based on the image data, a driver drives a display section for display control. The control section controls respective parts of a mobile radio terminal. Even while a moving picture is being reproduced, if call reception occurs, the control section temporarily suspends the reproduction of the moving picture and indicates the occurrence of call reception. If the call ends, the control section resumes the reproduction of the moving picture.

14 Claims, 7 Drawing Sheets

MOBILE RADIO TERMINAL

CROSS-REFERENCE TO RELATED APPLICATIONS

This application is based upon and claims the benefit of priority from the prior Japanese Patent Applications No. 2001-305768, filed Oct. 1, 2001; and No. 2002-235832, filed Aug. 13, 2002, the entire contents of both of which are incorporated herein by reference.

BACKGROUND OF THE INVENTION

1. Field of the Invention

The present invention relates generally to a mobile radio terminal capable of communication via a mobile communication system such as a mobile telephone system, and more particularly to a mobile radio terminal with a moving picture reproducing function.

2. Description of the Related Art

A modern mobile radio terminal such as a mobile phone has a function of reproducing a moving picture or voice. With such information being heard or viewed by a user, a great deal of information can be communicated.

In the meantime, with the conventional mobile radio terminal, there is a problem of how an incoming call, when received during reproduction of a moving picture, is indicated.

BRIEF SUMMARY OF THE INVENTION

The present invention has been made in consideration of the above problem, and its object is to provide a mobile radio terminal which is very convenient when an incoming call has been received during reproduction of a moving picture.

In order to achieve the object, this invention provides a mobile radio terminal having a function of displaying a moving picture, comprising: incoming call detection means for detecting an occurrence and an end of an incoming call; call reception indication means for indicating the occurrence of call reception when the incoming call detection means has detected the occurrence of the incoming call; a memory for storing data of the moving picture; a display for displaying a video image; and controller for reading in data from the memory and causing the display to display the moving picture, the controller temporarily suspending the display of the moving picture when the incoming call detection means has detected the occurrence of the incoming call.

According to the mobile radio terminal with this structure, when call reception has occurred while the moving picture is being displayed, the display of the moving picture is temporarily suspended.

Thus, according to the mobile radio terminal with this structure, call reception can surely be indicated to the user, and display of a moving picture is suspended only temporarily. Thus, the display can smoothly be resumed, which is convenient for the user.

This invention also provides a mobile radio terminal having a function of displaying a moving picture, comprising: a display for displaying an image; incoming call detection means for detecting an occurrence and an end of an incoming call; and display controller for controlling the display to display the moving picture, wherein when the incoming call detection means has detected the occurrence of the incoming call while the display is displaying the moving picture, the display controller causes the display to display the moving picture and a call reception indication image that indicates the occurrence of the incoming call.

According to the mobile radio terminal with this structure, if call reception occurs while the display is displaying the moving picture, the display displays both the moving picture and call reception indication image.

Thus, according to the mobile radio terminal with this structure, when call reception has occurred while the moving picture is being reproduced, the reproduced image is not changed to an image that only indicates the call reception, and the user can conveniently recognize the occurrence of the incoming call.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
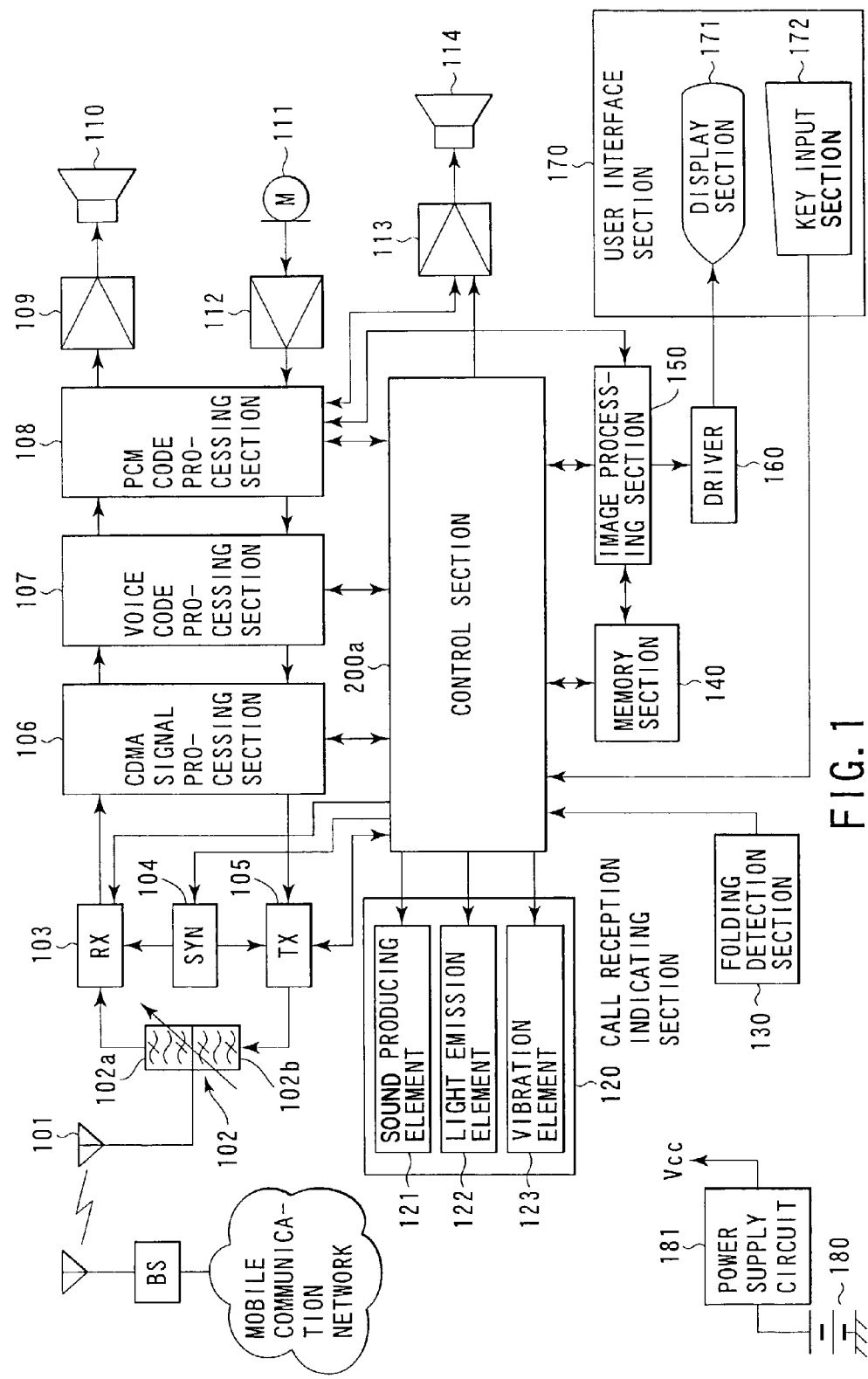
FIG. 1 is a circuit block diagram showing the structure of a mobile radio terminal according to an embodiment of the present invention.

FIG. 1 shows the structure of a mobile radio terminal according to a first embodiment of the present invention. The mobile radio terminal shown in FIG. 1 performs, for example, radio communication with a base station BS by CDMA (Code Division Multiple Access).

The base station BS transmits a radio frequency signal, and an antenna 101 receives the radio frequency signal. The radio frequency signal is then input to an antenna shared device 102. The antenna shared device 102 comprises a filter 102a for reception and a filter 102b for transmission.

Of radio frequency signals received by the antenna 101, the radio frequency signal sent from the base station BS passes through the reception filter 102a and goes to a receiving section (RX) 103. This radio frequency signal is prevented by the transmission filter 102b from going to a transmission section 105 (to be described later).

In the receiving section 103, the radio frequency signal is mixed with a reception local oscillation signal supplied from a frequency synthesizer (SYN) 104 and is frequency-converted to an intermediate-frequency signal.

The frequency of the reception local oscillation signal produced by the frequency synthesizer 104 is controlled by a control signal from a control section 200a. The receiving section 103 has a function of detecting a reception electric field intensity of a radio signal having a frequency designated by the control section 200a.

The intermediate-frequency signal obtained by the receiving section 103 is delivered to a CDMA signal processing section 106 and subjected to orthogonal demodulation processing and then inverse spread processing. Thus, the intermediate-frequency signal is converted to reception data of a predetermined format corresponding to a data rate. The produced reception data is output to a voice code processing section 107, and data representing the data rate is output to the control section 200a.

The voice code processing section 107 subjects the reception data obtained by the CDMA signal processing section 106 to decompression processing corresponding to a reception data rate provided by the control section 200a. The processed result is output to a PCM code processing section 108.

The PCM code processing section 108 decodes the reception data decompressed by the voice code processing section 107, thus producing an analog call signal. The decoded analog call signal is amplified by an amplifier 109 and output from a speaker 110.

When voice data is input to the PCM code processing section 108 from an image processing section 150, the PCM code processing section 108 decodes the voice data and produces an analog voice signal. The decoded analog voice signal is amplified by an amplifier 113 and output from a speaker 114.

The amplification levels of the amplifiers 109 and 113 are controlled by the control section 200a.

On the other hand, an input voice of a speaker comes in through a microphone (M) 111 as an analog outgoing call signal. The signal is amplified up to a proper level through an amplifier 112. The amplified signal is subjected to PCM encoding processing in the PCM code processing section 108. The processed signal is output as transmission data to the voice code processing section 107.

The voice code processing section 107 detects an input voice energy amount on the basis of the transmission data from the PCM code processing section 108. The voice code processing section 107 determines a data rate based on the detected result and tells it to the control section 200a. The voice code processing section 107 also compresses the transmission data into a burst signal of a format corresponding to the data rate, and delivers it to the CDMA signal processing section 106.

The CDMA signal processing section 106 subjects the burst signal compressed by the voice code processing section 107 to spread processing using PN codes corresponding to a transmission channel. The processed result is subjected to an orthogonal modulation process, and an obtained orthogonal-modulated signal is sent to the transmission section (TX) 105.

The transmission section 105 mixes the orthogonal-modulated signal with a transmission local oscillation signal, thus converting it to a radio-frequency (RF) signal. Based on the transmission data rate provided by the control section 200a, the transmission section 105 RF-amplifies only an effective component of the radio-frequency signal. The transmission section 105 outputs the RF-amplified signal to the antenna shared device 102. The transmission local oscillation signal is generated by the frequency synthesizer 104, and has a frequency corresponding to the control signal from the control section 200a.

Only a transmission-band RF signal component of the RF signal input to the antenna shared device 102 from the transmission section 105 is delivered to the antenna 101 through the transmission filter 102b. Thus, the transmission-band RF signal component is sent to the base station BS. The transmission-band RF signal component is prevented by the reception filter 102a from entering the receiving section 103.

A call reception indicating section 120 indicates call reception to the user under control of the control section 200a, when an incoming call has been received by the terminal apparatus. The call reception indicating section 120 comprises a sound producing element 121 that indicates call reception by audible sound, a light emission element 122 that indicates call reception by light, and a vibration element 123 that indicates call reception by vibration, e.g. vibration by an eccentric motor.

The mobile radio terminal has a foldable shape. In the folded state, a display section 171 and a key input section 172, which are to be described later, are folded up and closed to face each other. In the open state, the display section 171 and key input section 172 are exposed.

A folding detection section 130 detects a folded state or an open state of the mobile radio terminal, and tells a detection result to the control section 200a.

A memory section 140 comprises a semiconductor memory, such as a ROM or a RAM, as a memory medium. The memory medium stores, for instance, user data such as a telephone directory containing correlated names and phone numbers, moving picture data containing moving pictures and corresponding voices, and history data showing histories of outgoing calls and incoming calls.

An image processing section 150 comprises a purpose-specific image processing IC that decodes image data according to, e.g. MPEG (Moving Picture Experts Group) 4. The image processing section 150 is controlled by the control section 200a. The image processing section 150 subjects moving picture data input from the control section 200a to a predetermined data process and converts it to image data and voice data. The image processing section 150 outputs the image data to a driver 160 and the voice data to the PCM code processing section 108.

Based on the image data input from the image processing section 150, the driver 160 controls the display section 171 of a user interface section 170 (to be described later) and performs a display/non-display control and a control for displaying still images and moving pictures.

In accordance with an instruction from the control section 200a, the driver 160 performs a control for displaying on the display section 171 information relating to call reception along with the image data input from the image processing section 150.

The user interface section 170 comprises the display section 171 and key input section 172. The display section 171 comprises, e.g. an LCD (Liquid Crystal Display) or an EL (Electro Luminance). The user interface section 170 visually indicates to the user the state of the apparatus (call transmission/call reception, a remaining battery capacity, a reception intensity), dial data read out of the memory section 140, and various images including moving pictures.

The key input section 172 comprises various keys: keys associated with ordinary call transmission/reception functions, such as numeral keys for inputting dial numbers; keys for switching a call reception indicating mode (audible sound, light emission, vibration, no indication); keys for setting, e.g. reproduction of moving pictures; keys associated with access to telephone directory data; etc.

The control section 200a comprises a CPU, a ROM, and a RAM. The CPU controls the respective sections of the mobile radio terminal according to control programs and control data stored in the ROM.

A main function of the control section 200a is a communication control. Specifically, the control section 200a controls the receiving section 103, frequency synthesizer 104, transmission section 105 and CDMA signal processing section 106, and establishes a communication link with the base station BS by CDMA radio communication, thereby effecting communication over a mobile communication network including the base station BS.

Additionally, the control section 200a has a control function to control the image processing section 150 and thus effect reproduction of moving pictures, when it receives a request for moving picture reproduction from the user via the key input section 172. The control section 200a also has a function of controlling display/non-display modes of the display section 1 in accordance with the detection result of the folding detection section 130.

Furthermore, the control section 200a has a novel control function of controlling moving picture reproduction when call reception has occurred during a moving picture reproduction process, or when a call began and then has ended.

Besides, the control section 200a has a clock function and a timer function.

A power supply circuit 181 produces a predetermined operational power supply voltage Vcc based on an output from a battery 180, and supplies it to the respective circuits.

The operation of the mobile radio terminal having the above-described structure will now be described.

A description below relates only to an operation when call reception has occurred during moving picture reproduction. A description of operations relating to ordinary voice communications and data communications is omitted.

Figure 2:
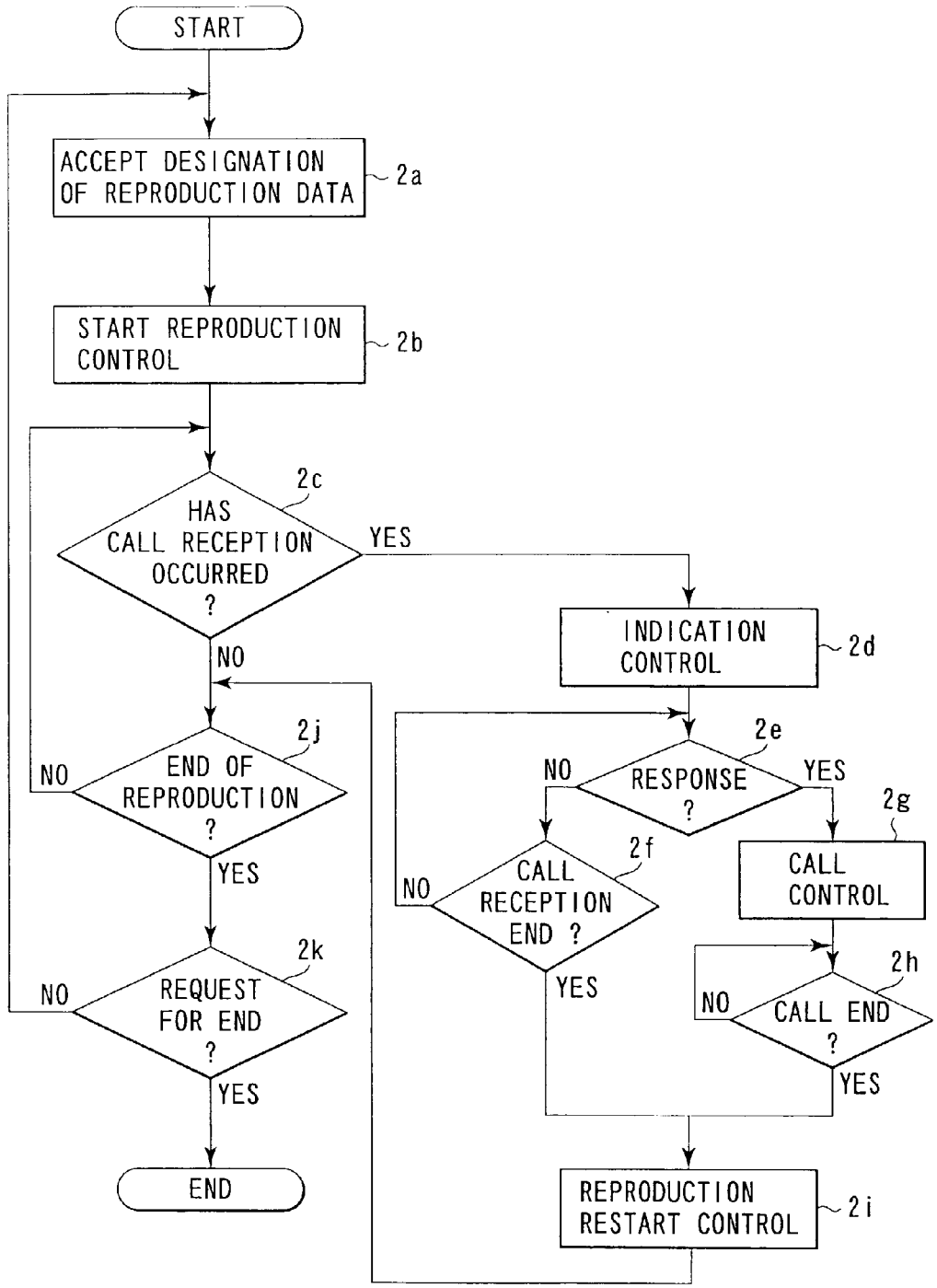
FIG. 2 is a flow chart illustrating a call reception indicating process during reproduction of a moving picture in the mobile radio terminal shown in FIG. 1.

FIG. 2 is a flow chart illustrating a process in a case where call reception has occurred during reproduction of a moving picture. This process is performed by the control section 200a, and is started in response to a request of the user via the key input section 172.

In step 2a, the image processing section 150 is controlled to display a list of moving picture data stored in the memory section 140. Designation of moving picture data to be reproduced is accepted through the key input section 172. Then, control goes to step 2b.

In step 2b, identification data of the moving picture data accepted in step 2a is told to the image processing section 150, and an instruction for reproduction is given to the image processing section 150. Then, control advances to step 2c.

Thereby, the image processing section 150 reads out moving picture data from the memory section 140, which corresponds to the identification information told by the control section 200a, and subjects the moving picture data to predetermined processing to produce image data and voice data. The image processing section 150 outputs the image data to the driver 160 and the voice data to the PCM code processing section 108.

Based on the image data input from the image processing section 150, the driver 160 drives the display section 171 to display a moving picture.

The voice data output from the image processing section 150 to the PCM code processing section 108 is converted to an analog voice signal by the PCM code processing section 108, and the analog voice signal is amplified by the amplifier 113 and output from the speaker 114.

In step 2c, a detection notice of call reception from the CDMA signal processing section 106 is monitored, and it is detected whether an incoming call has arrived at the mobile radio terminal.

If call reception has occurred in step 2c, control goes to step 2d. If not, control advances to step 2j.

In step 2d, at least one of the sound producing element 121, light emission element 122 and vibration element 123 is activated to start a call reception notice. In addition, the image processing section 150 is controlled to temporarily stop the reproduction of the moving picture and to cause the display section 171 to display information on the call reception. Then, control advances to step 2e.

The call reception notice by means of at least one of the sound producing element 121, light emission element 122 and vibration element 123, as well as the display section 171, is continued until the incoming call ends or is answered.

In step 2e, it is determined whether the user has shown the will to answer the incoming call through the key input section 172.

If the user has shown the will to answer the incoming call, control goes to step 2g. If not, control goes to step 2f.

In step 2f, a detection notice of call reception from the CDMA signal processing section 106 is monitored, and it is detected whether the incoming call has ended.

If the incoming call has ended, control advances to step 2i. If not, control returns to step 2e.

On the other hand, in step 2g, the respective sections associated with communication are controlled to send a response signal to the incoming call to the base station BS. According to a predetermined procedure, a communication link is established, and control advances to step 2h.

In step 2h, it is determined whether the call has ended.

If the call has ended, control advances to step 2i. If the call has not ended, control returns to step 2h to monitor the end of the call.

In step 2i, the image processing section 150 is controlled to resume the reproduction of the moving picture, which was suspended in step 2d. Control then goes to step 2j.

To resume the reproduction of the moving picture, the image processing section 150 reads in the moving picture data from the memory section 140. In this case, the reading-in of the moving picture data is resumed from the point at which the reproduction of the moving picture was suspended, and the reproduced content of the moving picture is made consistent before and after the occurrence of the incoming call.

In step 2j, it is determined whether the reproduction of the moving picture has ended.

If "YES" in step 2j, control advances to step 2k. If "NO" in step 2j, control returns to step 2c.

In step 2k, it is determined whether a request for the finish of the moving picture reproduction has been input through the key input section 172.

If "YES" in step 2k, the present process is finished. If "NO" in step 2k, that is, if a request to continue the moving picture reproduction has been accepted, control returns to step 2a.

Figure 3:
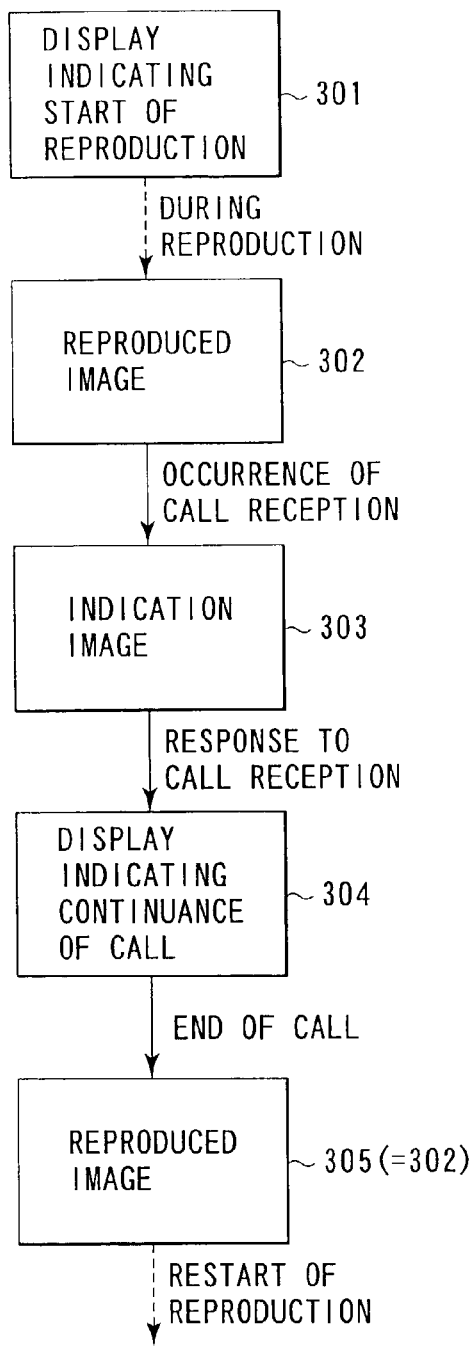
FIG. 3 illustrates a transition of display content on a display section of the mobile radio terminal shown in FIG. 1.

In the process illustrated in FIG. 2, the display content on the display section 171 changes in succession, as shown in FIG. 3.

When the moving picture reproduction control has started in step 2b, display content 301 indicating the start of reproduction appears on the display section 171. Then, a reproduced moving picture 302 is displayed.

If call reception has occurred, the reproduction of the moving picture is suspended, and a display image 303 indicating the occurrence of call reception appears.

This display image 303 shows information such as the telephone number of the originating party who is making the incoming call. The display image 303 is continued until the end of the incoming call from the indication of the occurrence of the call reception, or until the user operates the key input section 172 to answer the incoming call.

If the user answers the incoming call and starts radio communication, a display content 304 indicating continuance of the call appears on the display section 171. The display content 304 includes the time of the call.

If the call ends, the reproduction of the moving picture 305 (=302) is resumed from the point at which the reproduction was suspended.

As has been described above, according to the mobile radio terminal with the above-described structure, even while the moving picture is being reproduced, if call reception occurs, the reproduction of the moving picture is suspended and the occurrence of call reception is indicated.

Thus, according to this mobile radio terminal, even while the moving picture is being reproduced, the user can surely be notified of the call reception.

If the incoming call ends or if the incoming call is answered through the key input section 172, the reproduction of the moving picture is resumed from the point of suspension. Thus, the reproduced content of the moving picture is made consistent before and after the occurrence of the incoming call.

Accordingly, even if call reception occurs during the reproduction of the moving picture and the reproduction of the moving picture is suspended, smooth, continuous moving picture reproduction can be effected.

The present invention is not limited to the above embodiment.

Figure 4:
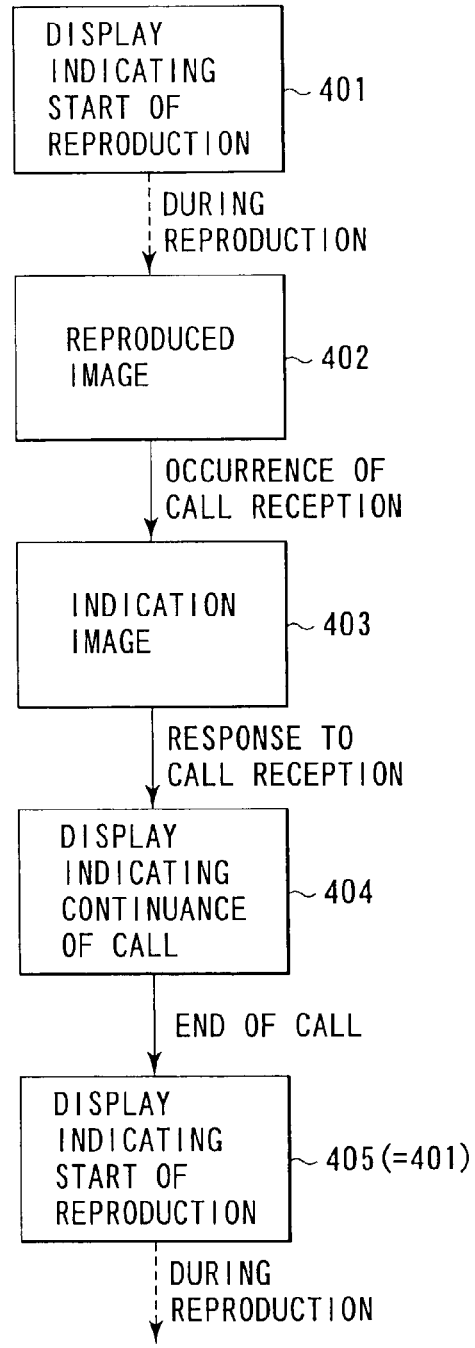
FIG. 4 illustrates a transition of display content on the display section of the mobile radio terminal shown in FIG. 1.

In the above embodiment, after the incoming call ends, the reproduction of the moving picture is resumed from the point of the suspension. Alternatively, after the incoming call ends, the reproduction of the moving picture data may be started once again from the beginning. FIG. 4 illustrates the transition of display content on the display section 171 in the case of this control.

When the moving picture reproduction control has started in step 2b, display content 401 indicating the start of reproduction appears on the display section 171. Then, a reproduced moving picture 402 is displayed.

If call reception has occurred, the reproduction of the moving picture is suspended, and a display image 403 indicating the occurrence of call reception appears.

This display image 403 shows information such as the telephone number of the originating party who is making the incoming call. The display image 403 is continued until the end of the incoming call from the indication of the occurrence of the call reception, or until the user operates the key input section 172 to answer the incoming call.

If the user answers the incoming call and starts radio communication, a display content 404 indicating continuance of the call appears on the display section 171. The display content 404 includes the time of the call.

If the call ends, display content 405 (=401) indicating the start of reproduction is displayed, and the reproduction is started once again from the beginning of the moving picture data.

According to this control, even if the reproduction of the moving picture is restarted after the user answered the incoming call and finished radio communication, the reproduced content can conveniently be confirmed once again.

In the above case, the moving picture reproduction may not necessarily be started once again from the beginning of the moving picture data. Alternatively, a plurality of chapters may be set in the moving picture data. When moving picture reproduction is resumed, the reproduction may be started, for example, from the beginning of an immediately preceding chapter.

Needless to say, various modifications may be made without departing from the spirit of the present invention.

A mobile radio terminal according to a second embodiment of the present invention will now be described.

Figure 5:
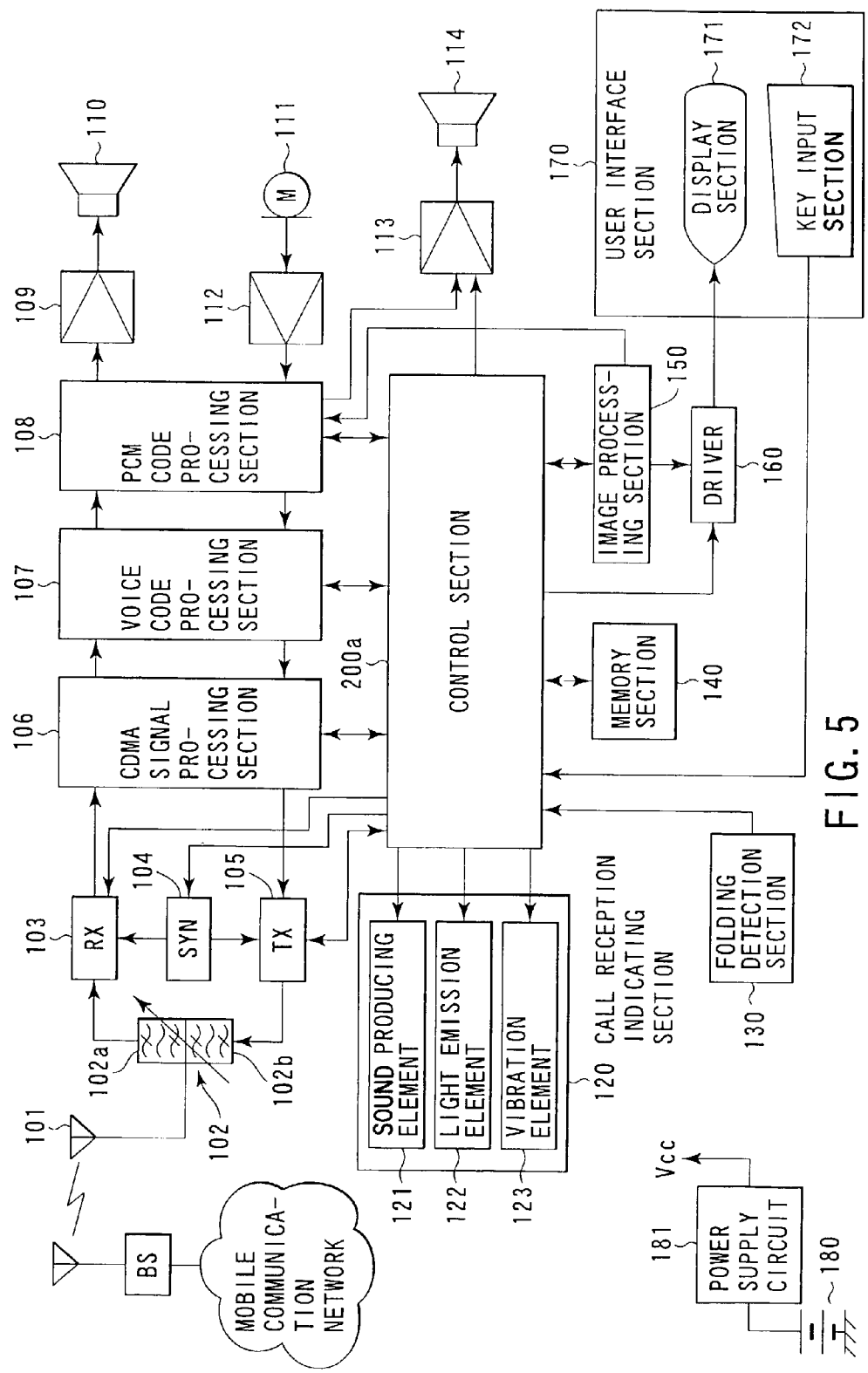
FIG. 5 is a circuit block diagram showing the structure of a mobile radio terminal according to another embodiment of the present invention.

FIG. 5 shows the structure of this mobile radio terminal. The mobile radio terminal shown in FIG. 5 performs, for example, radio communication with a base station BS by CDMA (Code Division Multiple Access).

The base station BS transmits a radio frequency signal, and an antenna 101 receives the radio frequency signal. The radio frequency signal is then input to an antenna shared device 102. The antenna shared device 102 comprises a filter 102a for reception and a filter 102b for transmission.

Of radio frequency signals received by the antenna 101, the radio frequency signal sent from the base station BS passes through the reception filter 102a and goes to a receiving section (RX) 103. This radio frequency signal is prevented by the transmission filter 102b from going to a transmission section 105 (to be described later).

In the receiving section 103, the radio frequency signal is mixed with a reception local oscillation signal supplied from a frequency synthesizer (SYN) 104 and is frequency-converted to an intermediate-frequency signal.

The frequency of the reception local oscillation signal produced by the frequency synthesizer 104 is controlled by a control signal from a control section 200b. The receiving section 103 has a function of detecting a reception electric field intensity of a radio signal having a frequency designated by the control section 200b.

The intermediate-frequency signal obtained by the receiving section 103 is delivered to a CDMA signal processing section 106 and subjected to orthogonal demodulation processing and then inverse spread processing. Thus, the intermediate-frequency signal is converted to reception data of a predetermined format corresponding to a data rate. The produced reception data is output to a voice code processing section 107, and data representing the data rate is output to the control section 200b.

The voice code processing section 107 subjects the reception data obtained by the CDMA signal processing section 106 to decompression processing corresponding to a reception data rate provided by the control section 200b. The processed result is output to a PCM code processing section 108.

The PCM code processing section 108 decodes the reception data decompressed by the voice code processing section 107, thus producing an analog call signal. The decoded analog call signal is amplified by an amplifier 109 and output from a speaker 110.

When voice data is input to the PCM code processing section 108 from an image processing section 150, the PCM code processing section 108 decodes the voice data and produces an analog voice signal. The decoded analog voice signal is amplified by an amplifier 113 and output from a speaker 114.

The amplification levels of the amplifiers 109 and 113 are controlled by the control section 200b.

On the other hand, an input voice of a speaker comes in through a microphone (M) 111 as an analog outgoing call signal. The signal is amplified up to a proper level through an amplifier 112. The amplified signal is subjected to PCM encoding processing in the PCM code processing section 108. The processed signal is output as transmission data to the voice code processing section 107.

The voice code processing section 107 detects an input voice energy amount on the basis of the transmission data from the PCM code processing section 108. The voice code processing section 107 determines a data rate based on the detected result and tells it to the control section 200b. The voice code processing section 107 also compresses the transmission data into a burst signal of a format corresponding to the data rate, and delivers it to the CDMA signal processing section 106.

The CDMA signal processing section 106 subjects the burst signal compressed by the voice code processing section 107 to spread processing using PN codes corresponding to a transmission channel. The processed result is subjected to an orthogonal modulation process, and an obtained orthogonal-modulated signal is sent to the transmission section (TX) 105.

The transmission section 105 mixes the orthogonal-modulated signal with a transmission local oscillation signal, thus converting it to a radio-frequency (RF) signal. Based on the transmission data rate provided by the control section 200b, the transmission section 105 RF-amplifies only an effective component of the radio-frequency signal. The transmission section 105 outputs the RF-amplified signal to the antenna shared device 102. The transmission local oscillation signal is generated by the frequency synthesizer 104, and has a frequency corresponding to the control signal from the control section 200b.

Only a transmission-band RF signal component of the RF signal input to the antenna shared device 102 from the transmission section 105 is delivered to the antenna 101 through the transmission filter 102b. Thus, the transmission-band RF signal component is sent to the base station BS. The transmission-band RF signal component is prevented by the reception filter 102a from entering the receiving section 103.

A call reception indicating section 120 indicates call reception to the user under control of the control section 200b, when an incoming call has been received by the terminal apparatus. The call reception indicating section 120 comprises a sound producing element 121 that indicates call reception by audible sound, a light emission element 122 that indicates call reception by light, and a vibration element 123 that indicates call reception by vibration, e.g. vibration by an eccentric motor.

The mobile radio terminal has a foldable shape. In the folded state, a display section 171 and a key input section 172, which are to be described later, are folded up and closed to face each other. In the open state, the display section 171 and key input section 172 are exposed.

A folding detection section 130 detects a folded state or an open state of the mobile radio terminal, and tells a detection result to the control section 200b.

A memory section 140 comprises a semiconductor memory, such as a ROM or a RAM, as a memory medium. The memory medium stores, for instance, user data such as a telephone directory containing correlated names and phone numbers, moving picture data containing moving pictures and corresponding voices, and history data showing histories of outgoing calls and incoming calls.

An image processing section 150 comprises a purpose-specific image processing IC that decodes image data according to, e.g. MPEG (Moving Picture Experts Group) 4. The image processing section 150 is controlled by the control section 200b. The image processing section 150 subjects moving picture data input from the control section 200b to a predetermined data process and converts it to image data and voice data. The image processing section 150 outputs the image data to a driver 160 and the voice data to the PCM code processing section 108.

Based on the image data input from the image processing section 150, the driver 160 controls the display section 171 of a user interface section 170 (to be described later) and performs a display/non-display control and a control for displaying still images and moving pictures.

In accordance with an instruction from the control section 200b, the driver 160 performs a control for displaying on the display section 171 information relating to call reception along with the image data input from the image processing section 150.

The user interface section 170 comprises the display section 171 and key input section 172. The display section 171 comprises, e.g. an LCD (Liquid Crystal Display) or an EL (Electro Luminance). The user interface section 170 visually indicates to the user the state of the apparatus (call transmission/call reception, a remaining battery capacity, a reception intensity), dial data read out of the memory section 140, and various images including moving pictures.

The key input section 172 comprises various keys: keys associated with ordinary call transmission/reception functions, such as numeral keys for inputting dial numbers; keys for switching a call reception indicating mode (audible sound, light emission, vibration, no indication); keys for setting, e.g. reproduction of moving pictures; keys associated with access to telephone directory data; etc.

The control section 200b comprises a CPU, a ROM, and a RAM. The CPU controls the respective sections of the mobile radio terminal according to control programs and control data stored in the ROM.

A main function of the control section 200b is a communication control. Specifically, the control section 200b controls the receiving section 103, frequency synthesizer 104, transmission section 105 and CDMA signal processing section 106, and establishes a communication link with the base station BS by CDMA radio communication, thereby effecting communication over a mobile communication network including the base station BS.

Additionally, the control section 200b has a control function to control the image processing section 150 and thus effect reproduction of moving pictures, when it receives a request for moving picture reproduction from the user via the key input section 172. The control section 200b also has a function of controlling display/non-display modes of the display section 1 in accordance with the detection result of the folding detection section 130.

Furthermore, the control section 200b has a novel control function of displaying, when call reception has occurred during a moving picture reproduction process, information relating to the call reception along with the reproduced moving picture.

Besides, the control section 200b has a clock function and a timer function.

A power supply circuit 181 produces a predetermined operational power supply voltage Vcc based on an output from a battery 180, and supplies it to the respective circuits.

The operation of the mobile radio terminal having the above-described structure will now be described.

A description below relates only to an operation when call reception has occurred during moving picture reproduction. A description of operations relating to voice communications and data communications over a mobile communication network is omitted.

Figure 6:
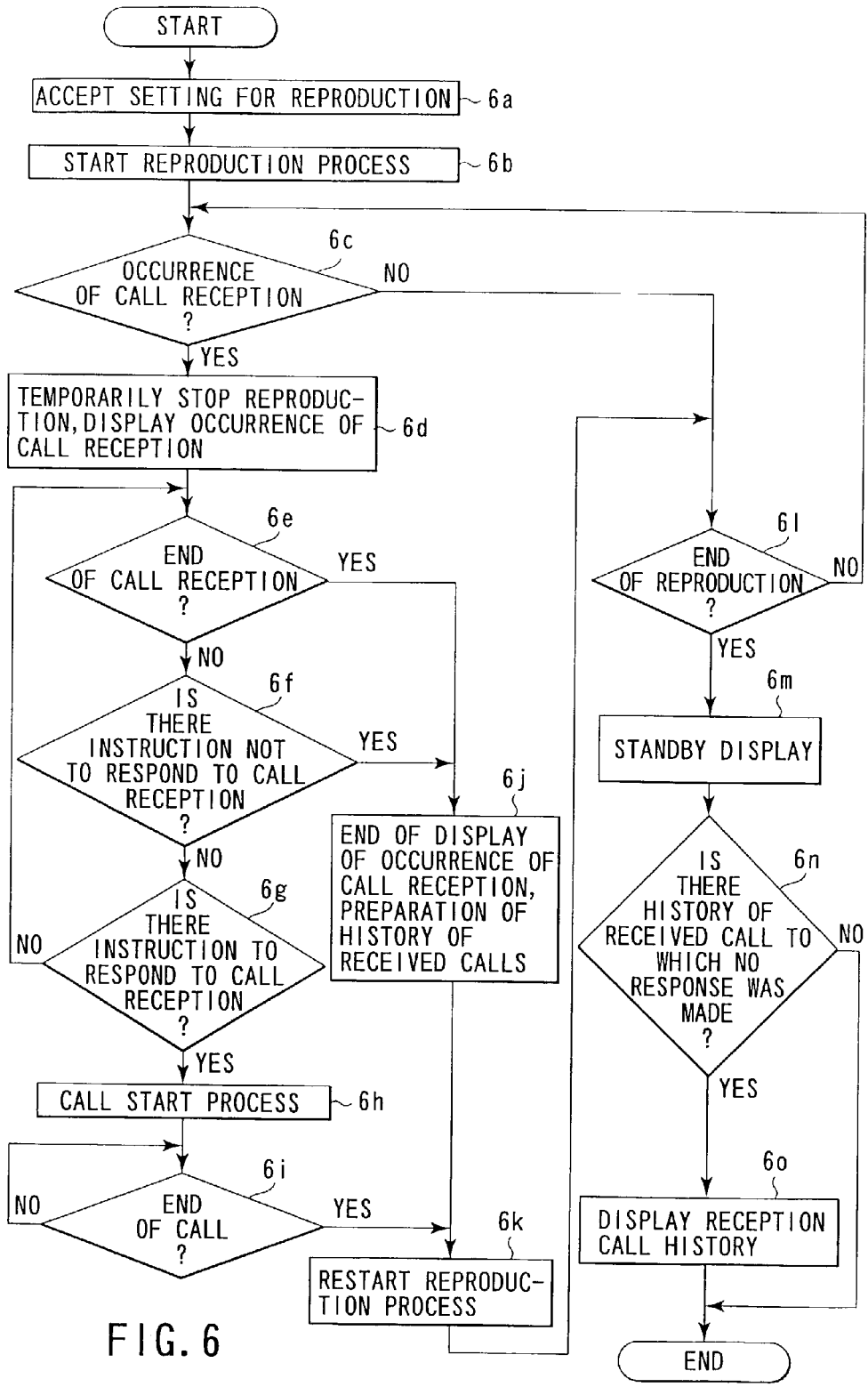
FIG. 6 is a flow chart illustrating an operation when the mobile radio terminal shown in FIG. 5 has received an incoming call during reproduction of a moving picture.
Figure 7:
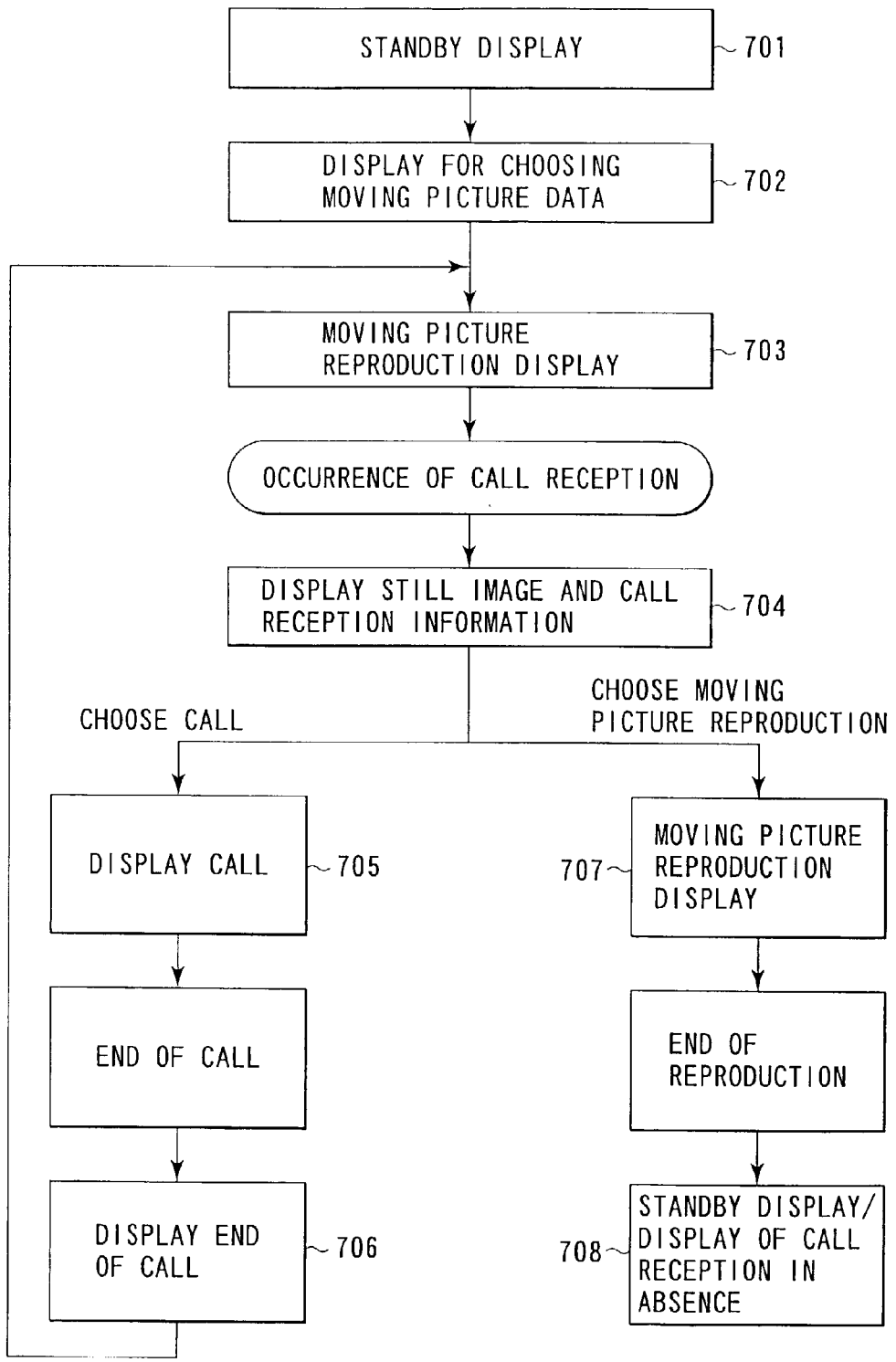
FIG. 7 illustrates a transition of display content when the mobile radio terminal shown in FIG. 5 has received an incoming call during reproduction of a moving picture.

FIG. 6 is a flow chart illustrating an operation when call reception has occurred during reproduction of a moving picture. The process illustrated in FIG. 6 is performed by the control section 200b. FIG. 7 illustrates a transition of display content on the display section 171.

The process in FIG. 6 starts when the user has issued a request for moving picture reproduction through the key input section 172 in the state in which the display section 171 displays a standby display image 701 as shown in FIG. 7.

In step 6a, the control section 200b causes the display section 171 to display a display content 702 (in FIG. 7) for choosing moving picture data, that is, a list of moving picture data stored in the memory section 140. Designation of moving picture data is accepted through the key input section 172. Then, control goes to step 6b.

In step 6b, the control section 200b starts a moving picture data reproduction process designated in step 6a. In this reproduction process, the control section 200b starts a control to read out the moving picture data designated in step 6a from the memory section 140. The read-out moving picture data is output to the image processing section 150.

The image processing section 150 subjects the moving picture data input from the control section 200b to a predetermined data process and converts it to image data and voice data. The image processing section 150 outputs the image data to the driver 160 and the voice data to the PCM code processing section 108.

The PCM code processing section 108 decodes the voice data input from the image processing section 150 and produces an analog voice signal. The decoded analog voice signal is amplified by the amplifier 113 and output from the speaker 114.

On the other hand, based on the image data input from the image processing section 150, the driver 160 controls the display section 171 of user interface section 170 so that the display section 171 may display a reproduced moving picture 703 as shown in FIG. 7.

If the moving picture reproduction process started, as described above, the control section 200b monitors in step 6c the reception data obtained by the CDMA signal processing section 106 and determines whether an incoming call to this terminal apparatus has arrived.

If call reception to the terminal apparatus has occurred ("YES" in step 6c), control advances to step 6d. If "NO" in step 6c, control goes to step 61.

In step 6d, the control section 200b detects an address of moving picture data in the memory section 140, which was being reproduced at the time the call reception occurred. This address is stored in the memory section 140 as a reproduction suspension position address.

In order to suspend the moving picture data reproducing process, the control section 200b controls the driver 160, thereby causing the display section 171 to display a display content 704 shown in FIG. 7, which includes a still image of the currently reproduced moving picture and call reception information. Then, control advances to step 6e.

The call reception information comprises the telephone number of the originating party who is making the incoming call, which is obtained from the received data at the time of call reception, and the name associated with the telephone number. This name, which corresponds to the telephone number, is retrieved by the control section 200b from the telephone directory data in the memory section 140.

Figure 8:
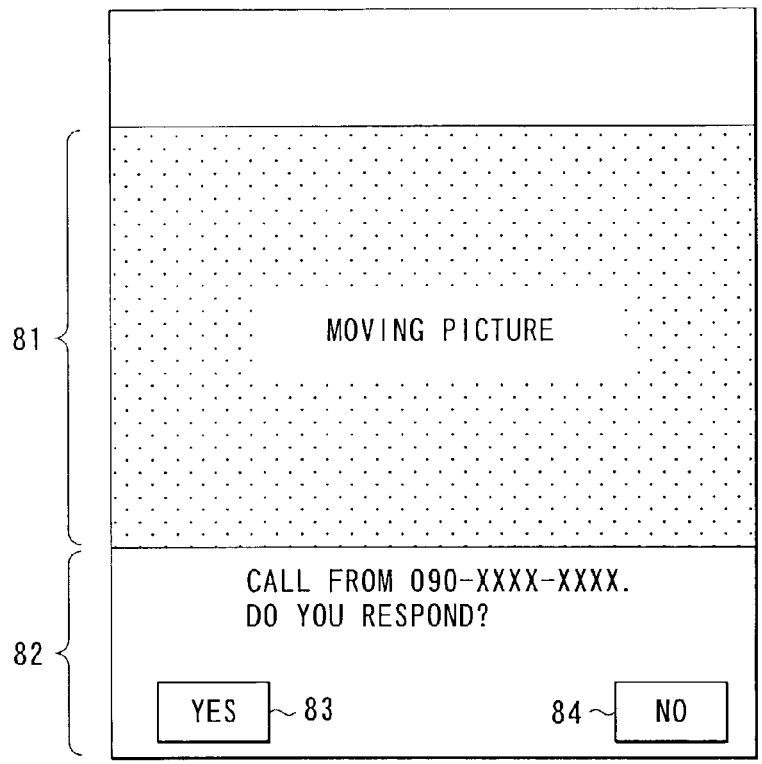
FIG. 8 shows an example of a screen display content when the mobile radio terminal shown in FIG. 5 has received an incoming call during reproduction of a moving picture.

FIG. 8 shows an example of display content displayed on the display section 171. In FIG. 8, an area 81 is to display a still image of the currently reproduced moving picture. An area 82 displays the telephone number of the originating party, the corresponding name, and a message associated with the call reception.

An area 83 displays "YES" associated with a predetermined key of the key input section 172, and an area 84 displays "NO" associated with a predetermined key of the key input section 172.

In step 6e, the control section 200b monitors the reception data obtained in the CDMA signal processing section 106 and determines whether the incoming call to the terminal apparatus has ended.

In other words, the control section 200b determines whether the incoming call has ended before the user answers it.

If the call reception has ended ("YES" in step 6e), control goes to step 6j. If not, control advances to step 6f.

In step 6f, the control section 200b determines whether the key of key input section 172, which is associated with "NO" in area 84, has been depressed.

In other words, the control section 200b determines whether the user has positively issued an instruction not to answer the incoming call.

If the key associated with "NO" is depressed, control goes to step 6j. If not, control advances to step 6g.

In step 6g, the control section 200b determines whether the key of key input section 172, which is associated with "YES" in area 83, has been depressed.

In other words, the control section 200b determines whether the user has positively issued an instruction to answer the incoming call.

If the key associated with "YES" is depressed, control advances to step 6h. If not, control goes back to step 6e.

In step 6h, the control section 200b controls the respective sections associated with communication to send a response signal to the incoming call and to establish a communication link. Thus, the call is enabled, and control advances to step 6i. At this time, the control section 200b causes the display section 171 to display a call display content 705, as shown in FIG. 7, which includes an elapsed time since the beginning of the call.

In step 6i, the control section 200b determines whether the call has ended.

Specifically, the control section 200b determines whether the user has depressed the call end key on the key input section 172, or whether the party at the other end has performed the call finishing operation, or whether the communication link is disconnected.

If the call has ended, the display section 171 displays a call end as the display content 705 in FIG. 7, and control goes to step 6k. If the call is continued, control returns to step 6i.

In step 6j, the control section 200b stops the display of call reception information, which was effected in step 6d, and stores in the memory section 140 correlated data of the originating party's telephone number and the time of call reception as non-answered call history data. Control then advances to step 6k.

In step 6k, the control section 200b resumes the moving picture data reproduction process.

The control section 200b reads out the reproduction suspension position address, which was stored in the memory section 140 in step 6d. Based on this address, the control section 200b starts a control to read out moving picture data from the memory section 140, and delivers the read-out moving picture data to the image processing section 150.

The image processing section 150 subjects the moving picture data input from the control section 200b to a predetermined data process and converts it to image data and voice data. The image processing section 150 outputs the image data to the driver 160 and the voice data to the PCM code processing section 108.

The PCM code processing section 108 decodes the voice data input from the image processing section 150 and produces an analog voice signal. The decoded analog voice signal is amplified by the amplifier 113 and output from the speaker 114.

On the other hand, based on the image data input from the image processing section 150, the driver 160 controls the display section 171 of user interface section 170 so that the display section 171 may display a reproduced moving picture 707 as shown in FIG. 7.

After the moving picture reproduction process is resumed, the control section 200b determines in step 61 whether the user has input a request for finishing moving picture reproduction through the key input section 172, and whether the moving picture reproduction has been completed.

If the user has input a request for finishing moving picture reproduction or if the moving picture reproduction has been completed, control advances to step 6m. If the user has not input a request for finishing moving picture reproduction while the moving picture reproduction has not been completed, control returns to step 6c.

In step 6m, the control section 200b controls the driver 160 to cause the display section 171 to display a standby display content, and control advances to step 6n. The standby display content includes a preset image, the time, and the intensity of radio waves received from the base station BS.

In step 6n, the control section 200b determines whether non-answered call history data was recorded in the memory section 140 in step 6j.

If there is non-answered call history data, control advances to step 6o. If not, the present process is finished.

In step 6o, the control section 200b causes the display section 171 to display a display content 708, as shown in FIG. 7, which includes a history display content based on the non-answered call history data stored in the memory section 140. This history display content is displayed over the standby display image effected in step 6m. Thus, the present process is finished. The history display content includes the originating party's telephone number and the time of call reception.

As has been described above, according to the mobile radio terminal with the above structure, when call reception occurs during moving picture reproduction, a still image of the moving picture is displayed and also the call reception information is displayed.

Thus, according to this mobile radio terminal, when call reception has occurred during moving picture reproduction, the currently played picture is not changed to the image that only indicates the call reception, and the user can recognize the call reception.

The information displayed in association with the occurrence of call reception includes the telephone number and the corresponding name in the telephone directory data. Hence, the user can immediately recognize the originating party who has sent the incoming call. Accordingly, the user can judge whether or not to answer the call.

In the mobile radio terminal with the above structure, when call reception occurs during moving picture reproduction, a still image of the moving picture is displayed and also the call reception information is displayed. From this state, in accordance with the user's request, the indication of call reception is stopped and the moving picture reproduction is resumed.

Thus, according to this mobile radio terminal, when the user has issued a request to resume the moving picture reproduction, the indication of call reception is stopped and the moving picture reproduction is resumed. Thus, the viewing/listening of the moving picture is not disturbed by the indication of call reception.

In the mobile radio terminal with the above structure, if call reception occurs during moving picture reproduction and the user starts the call and then finishes it, the moving picture reproduction is resumed from the point at which the reproduction was suspended by the call reception.

In the mobile radio terminal, if call reception occurs and the incoming call ends without answering it, the moving picture reproduction is resumed from the point at which the reproduction was suspended by the call reception.

Thus, according to this mobile radio terminal, even if call reception occurs during moving picture reproduction and the viewing/listening of the moving picture is suspended, the viewing/listening of the moving picture can be resumed from the point of suspension. There is no need to reproduce the moving picture from the beginning or to search for a point from which the reproduction is to be resumed.

In the mobile radio terminal with the above structure, if call reception occurs during moving picture reproduction and the user does not answer the incoming call, the non-answered call is indicated by display after the moving picture reproduction is completed.

Thus, according to this mobile radio terminal, even if the user forgets the call reception after having viewed/listened to the moving picture, for example, due to absorption with it, the non-answered call is indicated by display.

As described above, the mobile radio terminal with the above structure is very convenient when call reception occurs during moving picture reproduction.

The present invention is not limited to the above embodiment.

For example, in the above embodiment, when call reception has occurred, the currently reproduced moving picture is stopped, and a still image of the moving picture and call reception information are displayed. Alternatively, the reproduction of the moving picture may be continued and call reception information may be displayed along with it.

Even when the moving picture and call reception information are simultaneously displayed, if the user inputs some instruction through the key input section 172, the display of call reception information may be finished and only the reproduction of moving picture may be continued.

For example, in the above embodiment, when call reception occurs, the system side informs the terminal apparatus of the originating party's telephone number, and the telephone number and the associated name in the telephone directory data are displayed as call reception information.

In the near future, it is expected that the system side may provide new services for informing terminal apparatuses of pre-registered stores' names, etc., in addition to originating party's telephone numbers. To cope with the new services, when call reception has occurred, information on stores' names, etc. provided by the system side may be displayed as call reception information.

Figure 9:
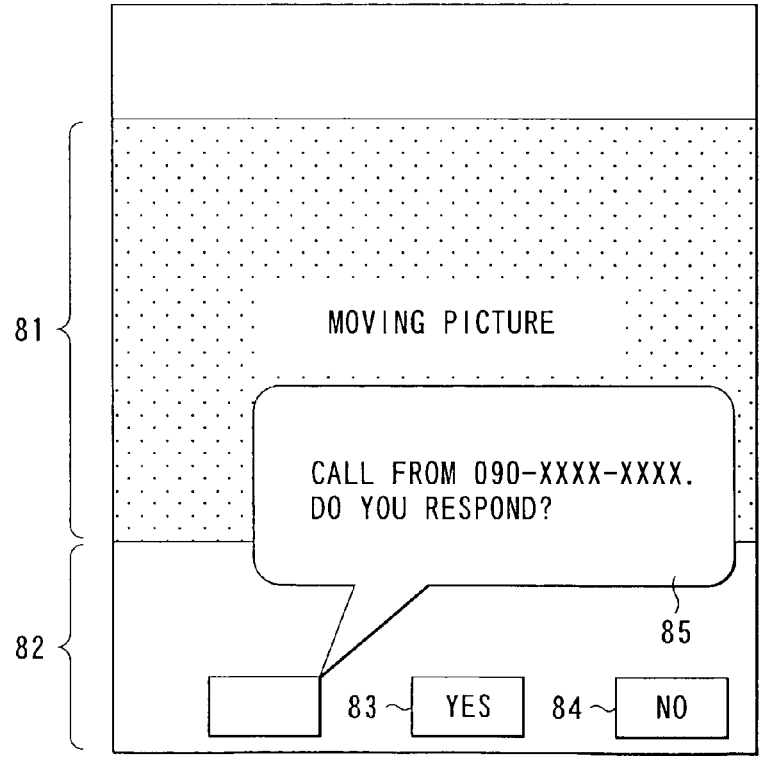
FIG. 9 shows another example of a screen display content when the mobile radio terminal shown in FIG. 5 has received an incoming call during reproduction of a moving picture.

In the example of display content in step 6d, the still image of moving picture and the call reception information are displayed so as not to overlap, as shown in FIG. 8. Alternatively, as shown in FIG. 9, a balloon display area 45 may be overlapped with part of the still image, and the call reception information may be displayed on the area 45.

The present invention can be applied to a PDA (Personal Digital Assistants) that has a moving picture reproduction function and a communication function over a mobile communication system with connection to a mobile radio terminal or a communication card. With such structure, the same advantages can be obtained.

Needless to say, various modifications may be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal configured to display a moving picture, comprising:
incoming call detection means for detecting an occurrence and an end of an incoming call;
call reception indication means for indicating the occurrence of call reception when the incoming call detection means has detected the occurrence of the incoming call;
a memory for storing data of the moving picture;
a display for displaying a video image;
call end detection means for detecting an end of a call; and
controller for reading in the data from the memory and causing the display to display the moving picture, the controller temporarily suspending the display of the moving picture when the incoming call detection means has detected the occurrence of the incoming call,
wherein the controller resumes the display of the moving picture, which has been temporarily suspended, when the call end detection means has detected the end of the call.

2. A mobile radio terminal configured to display a moving picture, comprising:
incoming call detection means for detecting an occurrence and an end of an incoming call;
call reception indication means for indicating the occurrence of call reception when the incoming call detection means has detected the occurrence of the incoming call;
a memory for storing data of the moving picture;
a display for displaying a video image; and
controller for reading in the data from the memory and causing the display to display the moving picture, the controller temporarily suspending the display of the moving picture when the incoming call detection means has detected the occurrence of the incoming call,
wherein when the controller resumes the display of the moving picture, which has been temporarily suspended, the controller reads in the data from the memory and controls the display of the moving picture such that the display of the moving picture has consistency before and after the occurrence of the incoming call.

3. A mobile radio terminal configured to display a moving picture, comprising:
incoming call detection means for detecting an occurrence and an end of an incoming call;
call reception indication means for indicating the occurrence of call reception when the incoming call detection means has detected the occurrence of the incoming call;
a memory for storing data of the moving picture;
a display for displaying a video image; and
controller for reading in the data from the memory and causing the display to display the moving picture, the controller temporarily suspending the display of the moving picture when the incoming call detection means has detected the occurrence of the incoming call,
wherein when the controller resumes the display of the moving picture, which has been temporarily suspended, the controller resumes the display of the moving picture by reading in the data from the memory up to data corresponding to a predetermined preceding point for reproduction.

4. A mobile radio terminal configured to display a moving picture, comprising:
incoming call detection means for detecting an occurrence and an end of an incoming call;
call reception indication means for indicating the occurrence of call reception when the incoming call detection means has detected the occurrence of the incoming call;
a memory for storing data of the moving picture;
a display for displaying a video image; and
controller for reading in the data from the memory and causing the display to display the moving picture, the controller temporarily suspending the display of the moving picture when the incoming call detection means has detected the occurrence of the incoming call,
wherein the controller resumes the display of the moving picture, which has been temporarily suspended, when incoming call detection means has detected the end of the incoming call.

5. A mobile radio terminal having a function of displaying a moving picture, comprising:
a display for displaying an image;
incoming call detection means for detecting an occurrence and an end of an incoming call; and
display controller for controlling the display to display the moving picture, wherein when the incoming call detection means has detected the occurrence of the incoming call while the display is displaying the moving picture, the display controller causes the display to display simultaneously the moving picture and a call reception indication image that indicates the occurrence of the incoming call.

6. A mobile radio terminal according to claim 5, further comprising input means for accepting a request by a user, wherein when the input means has accepted the request by the user, the display controller controls the display and finishes the display of the call reception indication image.

7. A mobile radio terminal according to claim 5, wherein the display controller displays an image indicating the presence of a non-answered incoming call, when an incoming call has not been answered and reproduction of the moving picture has been finished.

8. A mobile radio terminal according to claim 7, further comprising:
caller detection means for detecting caller identification information for the incoming call; and
outgoing call control means for making an outgoing call in accordance with the identification information detected by the caller detection means when the incoming call has not been answered, reproduction of the moving picture has been finished, and the input means has accepted a request for outgoing call.

9. A mobile radio terminal according to claim 7, further comprising:
caller detection means for detecting caller identification information at the incoming call; and
outgoing call control means for making an outgoing call in accordance with the identification information detected by the caller detection means when the incoming call has not been answered, reproduction of the moving picture has been finished, and the input means has accepted a request for outgoing call.

10. A mobile radio terminal configured to display a moving picture, comprising:
a display for displaying an image;
incoming call detection means for detecting an occurrence and an end of an incoming call;
call end detection means for detecting whether a call has ended; and
a display controller for controlling the display to display the moving picture,
wherein when the incoming call detection means has detected the occurrence of the incoming call while the display is displaying the moving picture, the display controller temporarily suspends reproduction of the moving picture and causes the display to display simultaneously a still image of the moving picture and a call reception indication image that indicates the occurrence of the incoming call, and
wherein when the call end detection means has detected the end of the call, the display controller controls the display and resumes the temporarily suspended reproduction of the moving picture.

11. A mobile radio terminal configured to display a moving picture, comprising:
a display for displaying an image;
incoming call detection means for detecting an occurrence and an end of an incoming call; and
a display controller for controlling the display to display the moving picture,
wherein when the incoming call detection means has detected the occurrence of the incoming call while the display is displaying the moving picture, the display controller temporarily suspends reproduction of the moving picture and causes the display to display simultaneously a still image of the moving picture and a call reception indication image that indicates the occurrence of the incoming call, and
wherein the display controller controls the display and resumes the display of the moving picture, which has been temporarily suspended, when the incoming call detection means has detected the end of the incoming call.

12. A mobile radio terminal configured to display a moving picture, comprising:
a display for displaying an image;
incoming call detection means for detecting an occurrence and an end of an incoming call; and
a display controller for controlling the display to display the moving picture,
wherein when the incoming call detection means has detected the occurrence of the incoming call while the display is displaying the moving picture, the display controller temporarily suspends reproduction of the moving picture and causes the display to display simultaneously a still image of the moving picture and a call reception indication image that indicates the occurrence of the incoming call, and
wherein the display controller displays an image indicating the presence of a non-answered incoming call, when an incoming call has not been answered and reproduction of the moving picture has been finished.

13. A mobile radio terminal configured to display a moving picture, comprising:
a display for displaying a video image;
first and second input means for receiving respective instructions for dealing with an incoming call;
incoming call detection means for detecting an occurrence of an incoming call; and
display control means for controlling the display to display the moving picture, wherein when the incoming call detection means has detected the occurrence of the incoming call while the display is displaying the moving picture, the display controller causes the display to display simultaneously the moving picture, an image which indicates the occurrence of the incoming call, and first and second images indicating the respective instructions and being in respective positions corresponding to the first and second input means.

14. A mobile radio terminal having a function of displaying a moving picture, comprising:
a display for displaying a video image;
first and second input means for receiving respective instructions for dealing with an incoming call;
incoming call detection means for detecting an occurrence of an incoming call; and
display control means for controlling the display to display the moving picture,
wherein when the incoming call detection means has detected the occurrence of the incoming call while the display is displaying the moving picture, the display controller causes the display to display simultaneously a still image of the moving picture, an image which indicates the occurrence of the incoming call, and first and second images indicating the respective instructions and being in respective positions corresponding to the first and second input means.

* * * * *